United States Patent
Mushikabe et al.

(10) Patent No.: US 7,965,613 B2
(45) Date of Patent: Jun. 21, 2011

(54) IMAGE READER

(75) Inventors: Kazuya Mushikabe, Hamamatsu (JP); Hisanori Itoga, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 395 days.

(21) Appl. No.: 12/110,747

(22) Filed: Apr. 28, 2008

(65) Prior Publication Data

US 2008/0279084 A1  Nov. 13, 2008

Related U.S. Application Data

(63) Continuation-in-part of application No. 11/959,910, filed on Dec. 19, 2007, now abandoned.

(30) Foreign Application Priority Data

Dec. 19, 2006 (JP) ................................. 2006-341365
Apr. 27, 2007 (JP) ................................. 2007-119463

(51) Int. Cl.
 *G11B 7/00* (2006.01)
(52) U.S. Cl. ............... 369/125; 369/112.01; 369/112.02; 369/275.1
(58) Field of Classification Search ............... 369/47.1, 369/275.4, 116, 125, 112.01, 112.02, 275.1, 369/59.23, 95; 359/838; 382/100
See application file for complete search history.

(56) References Cited

U.S. PATENT DOCUMENTS

| | | |
|---|---|---|
| 5,589,952 A | 12/1996 | Sato et al. |
| 2003/0117932 A1* | 6/2003 | Morishima et al. ........... 369/116 |
| 2003/0142613 A1* | 7/2003 | Anderson ..................... 369/125 |
| 2003/0194214 A1* | 10/2003 | Anderson et al. ............... 386/95 |
| 2004/0001413 A1* | 1/2004 | Suyama ..................... 369/59.23 |
| 2004/0105571 A1* | 6/2004 | Ikenoue et al. ............... 382/100 |
| 2005/0265158 A1* | 12/2005 | Minamimoto et al. ...... 369/47.1 |
| 2007/0024995 A1* | 2/2007 | Hayashi ........................ 359/838 |
| 2007/0256088 A1 | 11/2007 | Yamamoto et al. |
| 2007/0286057 A1* | 12/2007 | Honda et al. ............... 369/275.1 |
| 2009/0129253 A1* | 5/2009 | Kubo et al. ................. 369/275.4 |
| 2009/0135708 A1* | 5/2009 | Shibata et al. ............. 369/275.4 |

FOREIGN PATENT DOCUMENTS

| | | |
|---|---|---|
| EP | 1 308 938 A2 | 5/2003 |
| EP | 1 331 641 A2 | 7/2003 |
| EP | 1 482 489 A2 | 12/2004 |
| JP | 2002-197655 A | 7/2002 |

(Continued)

OTHER PUBLICATIONS

Japanese Office Action dated Dec. 16, 2008 w/English translation (five (5) pages).

(Continued)

*Primary Examiner* — Thuy N Pardo
(74) *Attorney, Agent, or Firm* — Crowell & Moring LLP

(57) ABSTRACT

An LPF performs low-pass filtering for a light reception signal responsive to return light received by an optical pickup. A comparator makes a comparison between the level of the signal output from the LPF and a predetermined threshold value and outputs a high or low pulse signal MIR. A system control section determines the pulse signal MIR for each predetermined dot region. If the pulse signal MIR output from the comparator is high, the system control section writes "1" into buffer memory; if the pulse signal MIR is low, the system control section writes "0" into the buffer memory. The pixel string data recorded in the buffer memory is transferred to a host and an image responsive to pixel string data is displayed on a display.

12 Claims, 14 Drawing Sheets

| FOREIGN PATENT DOCUMENTS | | | |
|---|---|---|---|
| JP | 2003-16649 | A | 1/2003 |
| JP | 2003-228955 | A | 8/2003 |
| JP | 2006-155812 | A | 6/2006 |
| JP | 2006-302503 | A | 11/2006 |

OTHER PUBLICATIONS

European Search Report dated Feb. 2, 2009 (eight (8) pages).
European Search Report dated Dec. 14, 2010 (ten (10) pages).

* cited by examiner

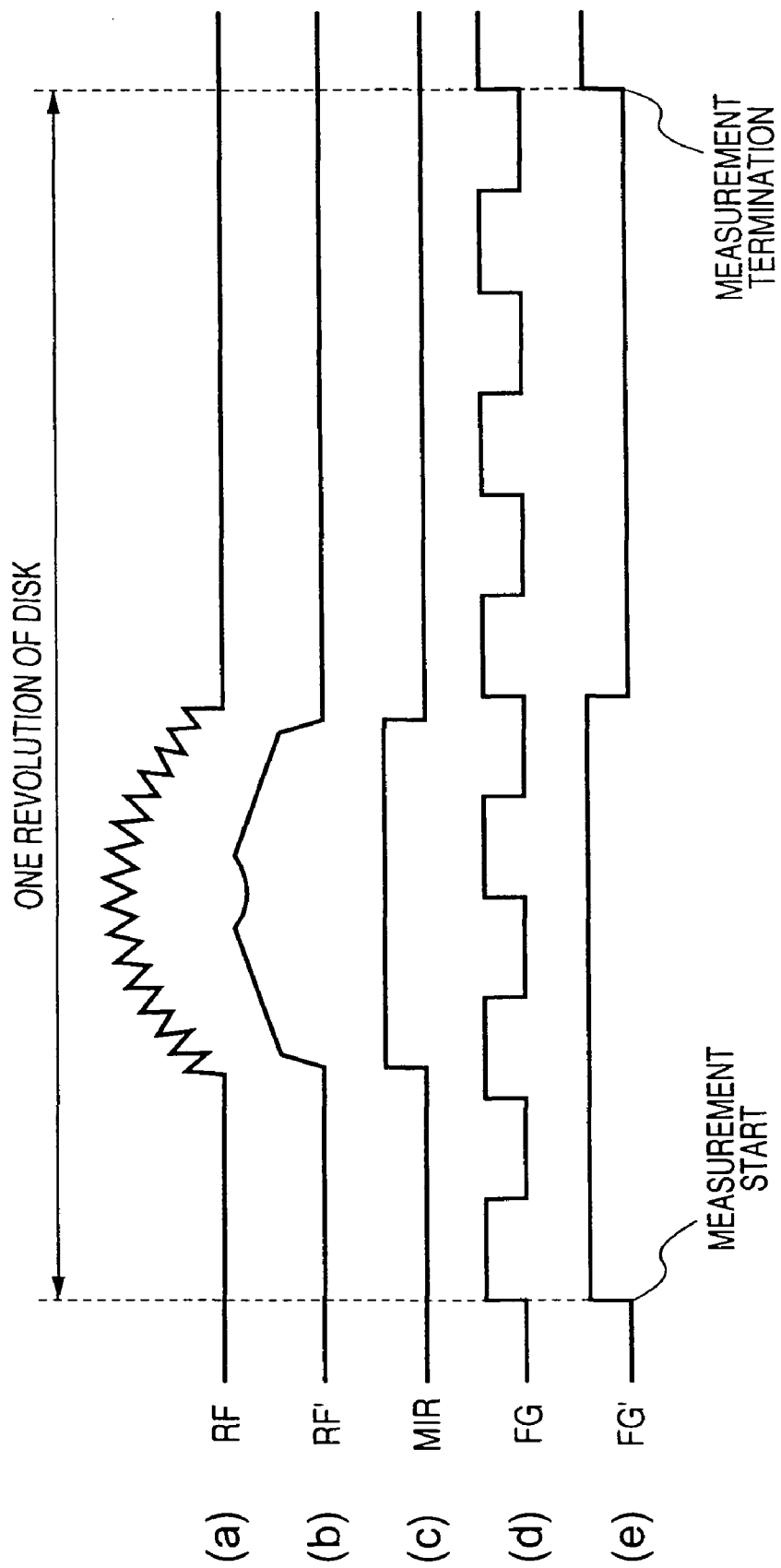

IMAGE READER

CROSS-REFERENCE TO RELATED DOCUMENTS

The present invention is a continuation in part (CIP) to patent application Ser. No. 11/959,910 entitled "IMAGE READER" filed on Dec. 19, 2007 now abandoned, disclosures of which are incorporated herein in their entirety by reference.

BACKGROUND OF THE INVENTION

This invention relates to a technology for reading an image drawn on an optical disk.

In optical disks of a CD-R (Compact Disk-Recordable), a CD-RW (Compact Disk Rewritable), a DVD-R (Digital Versatile Disk-Recordable), etc., the descriptions of recorded data cannot be recognized with the naked eye and thus it is difficult to distinguish the optical disks from each other from the appearance of the optical disk unless a label is put or something is printed. Then, an art of drawing a character, a symbol, a pattern, a design, etc., on an optical disk so as to make it possible to easily distinguish the optical disk according to the appearance thereof is proposed. (For example, refer to JP-A-2006-155812, JP-A-2003-16649, etc.)

By the way, a demand for editing an image drawn on an optical disk or adding an image often occurs. In this case, it is preferable to grasp the image already drawn on the optical disk.

SUMMARY OF THE INVENTION

It is therefore an object of the invention to provide a technology capable of reading an image drawn on an optical disk.

In order to achieve the object, the present invention provides the following arrangement.

(1) An image reader comprising:
  a rotation unit that rotates an optical disk;
  an irradiation unit that is movable in a radial direction of the optical disk and irradiates the optical disk rotated by the rotation unit with laser light;
  a feeding unit that transports the irradiation unit in the radial direction while the rotation unit rotates the optical disk;
  a gradation level determination unit that receives reflection light of the laser light applied to the optical disk by the irradiation unit and determines a gradation level for each predetermined dot region along a circumferential direction of the optical disk in response to an amount of the received reflection light; and
  an output unit that outputs pixel data indicating the gradation level for each dot region determined by the gradation level determination unit.

(2) The image reader according to (1) further comprising a position information acquisition unit that acquires position information indicating a read start position and a read termination position in the radial direction of the optical disk,
  wherein the feeding unit transports the irradiation unit from the read start position to the read termination position indicated by the position information acquired by the position information acquisition unit by a predetermined feed width in the radial direction each time the optical disk makes one revolution, and
  wherein the gradation level determination unit receives the reflection light of the laser light applied to the optical disk by the irradiation unit over a time period during which the optical disk makes one revolution.

(3) The image reader according to (2) further comprising a feed width information storage that stores feed width information indicating the feed width,
  wherein the feeding unit transports the irradiation unit from the read start position to the read termination position by the feed width indicated by the feed width information stored in the feed width information storage in the radial direction each time the optical disk makes one revolution.

(4) The image reader according to (2) further comprising a feed width information acquisition unit that acquires feed width information indicating the feed width,
  wherein the feeding unit transports the irradiation unit from the read start position to the read termination position by the feed width indicated by the feed width information acquired by the feed width information acquisition unit in the radial direction each time the optical disk makes one revolution.

(5) The image reader according to (2) further comprising a dot region information storage that stores dot region information indicating the dot region,
  wherein the gradation level determination unit receives reflection light of the laser light applied to the optical disk by the irradiation unit and determines the gradation level for each dot region indicated by the dot region information stored in the dot region information storage in response to the amount of the received reflection light.

(6) The image reader according to (2) further comprising a dot region information acquisition unit that acquires dot region information indicating the dot region,
  wherein the gradation level determination unit receives reflection light of the laser light applied to the optical disk by the irradiation unit and determines the gradation level for each dot region indicated by the dot region information acquired by the dot region information acquisition unit in response to the amount of the received reflection light.

(7) The image reader according to (1) further comprising an irradiation position controller that oscillates an irradiated position of the laser light in the radial direction,
  wherein the gradation level determination unit receives the reflection light of the laser light applied by the irradiation unit and oscillated by the irradiation position controller.

(8) The image reader according to (7), wherein the feed unit transports the irradiation unit transports the irradiation unit by a distance corresponding to a pitch in the radial direction of the dot arrangement in a substantially radial direction of the optical disk each time the optical disk makes multiple revolutions,
  wherein the irradiation position controller controls so that an irradiation path of the laser light irradiated to the optical disk is different for each revolution.

(9) The image reader according to (8), wherein the irradiation position controller controls the irradiation position of the laser light in response to a voltage of an oscillating signal, and generates the oscillating signal with constant amplitude and frequency and with different phase for each revolution, when the optical disk makes multiple revolutions.

(10) The image reader according to (8) further comprising:
  a position information acquisition unit that acquires position information indicating a read start position and a read termination position in the radial direction of the optical disk; and a feed width information acquisition unit that acquires feed width information indicating the feed width,
  wherein the feeding unit transports the irradiation unit from the read start position to the read termination position by the feed width indicated by the feed width information acquired by the feed width information acquisition unit in the radial direction each time the optical disk makes multiple revolutions.

(11) The image reader according to (7) further comprising a dot region information storage that stores dot region information indicating the dot region, wherein the gradation level determination unit receives reflection light of the laser light applied to the optical disk by the irradiation unit and determines the gradation level for each dot region indicated by the dot region information stored in the dot region information storage in response to the amount of the received reflection light.

(12) The image reader according to (7) further comprising a dot region information acquisition unit that acquires dot region information indicating the dot region, wherein the gradation level determination unit receives reflection light of the laser light applied to the optical disk by the irradiation unit and determines the gradation level for each dot region indicated by the dot region information acquired by the dot region information acquisition unit in response to the amount of the received reflection light.

(13) A method of reading an image formed on an optical disk, the method comprising:
rotating an optical disk;
irradiating the optical disk by an irradiation unit with a laser light at a predetermined level;
transporting the irradiation unit of the optical disk by a predetermined feed width in a radial direction of the optical disk while the optical disk is rotated;
receiving reflection light of the laser light applied to the optical disk by the irradiation unit;
determining a gradation level for each predetermined dot region along a circumferential direction of the optical disk in response to an amount of the received reflection light; and
outputting pixel data indicating the determined gradation level for each dot region.

(14) The method according to (13) further comprising acquiring position information indicating a read start position and a read termination position in the radial direction of the optical disk;
wherein the irradiation unit is transported from the read start position to the read termination position indicated in the acquired position information by a predetermined feed with in the radial direction each time the optical disk makes one revolution, and
wherein the reflection light of the laser light applied to the optical disk is received over a time period during which the optical disk makes one revolution.

(15) The method according to (13) further comprising oscillating an irradiated position of the laser light in the radial direction,
wherein the reflection light of the irradiated and oscillated laser light is received.

(16) A method of drawing an image on an optical disk, comprising:
reading an image formed on the optical disk by irradiating the rotated optical disk with laser light and receiving reflected laser light from the rotated optical disk;
detecting an empty region from the read image; and
forming additional image on the detected empty region by irradiating the optical disk with laser light.

(17) The method according to (16) further comprising, if two or more non-drawing regions are detected, determining a size of each of the non-drawing regions and determining one of the non-drawing regions in which the additional image is to be formed.

According to the invention, the image drawn on the optical disk can be read.

BRIEF DESCRIPTION OF THE DRAWINGS

FIG. 3 is a time chart of various signals at the image read time;

DETAILED DESCRIPTION OF THE PREFERRED EMBODIMENTS

First Embodiment

An optical disk recorder 1 according to a first embodiment of the invention has a function of recording and playing back music data, for example, on an optical disk (data record and playback function), a function of drawing an image that can be visually recognized by the user on the optical disk (drawing function), and a function of reading the image drawn on the optical disk (image read function). First, the configuration of the optical disk will be discussed and then the optical disk recorder 1 will be discussed.

Figure 1:
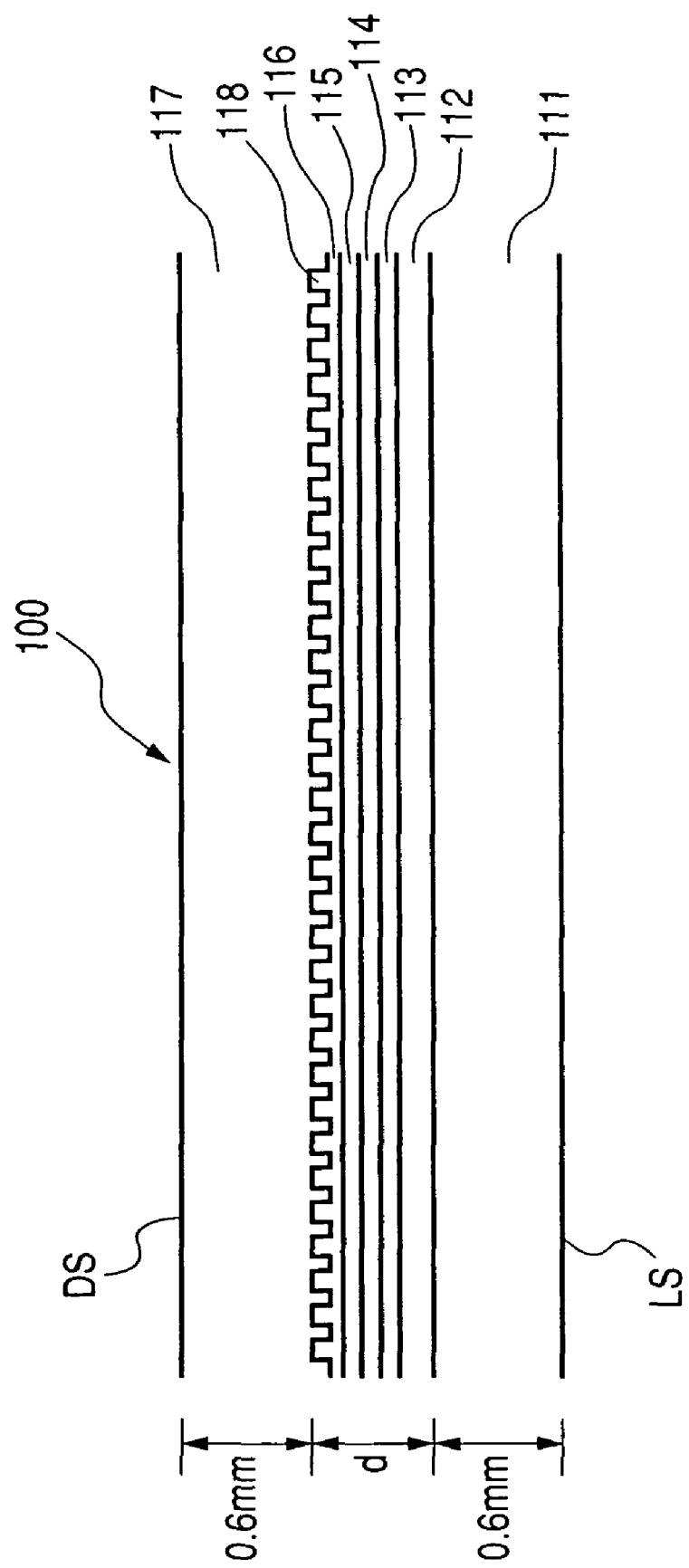
FIG. 1 is a sectional view of an optical disk according to a first embodiment of the present invention.

(1) Configuration
(1-1) Configuration of Optical Disk
FIG. 1 is a sectional view of an optical disk 100 according to the embodiment of the invention. The optical disk 100 is an optical disk of DVD-R, CD-R, CD-R/DVD-R mix type, for example. As shown in FIG. 1, on the optical disk 100, a polycarbonate layer 111, a drawing layer 112, a reflection layer 113, an adhesive layer 114, a reflection layer 115, a data record layer 116, and a polycarbonate layer 117 are arranged in order from a label side LS to a record side DS. The thickness of the optical disk 100 is about 1.2 (mm) and the polycarbonate layer 111 and the polycarbonate layer 117 occupy each about 0.6 (mm) of the thickness and a thickness d from the drawing layer 112 to the data record layer 116 is minute as compared with the whole thickness. The record side DS of the data record layer 116 is formed with a spiral groove (guide groove) 118.

The drawing layer 112 and the data record layer 116 are each a pigment layer formed of a substance changed in color when it is irradiated with laser light of a predetermined strength or more. At the drawing time, laser light is focused on the drawing layer 112 based on the reflection light from the reflection layer 113. Upon irradiation with laser light of a predetermined strength or more, the region of the drawing layer 112 irradiated with the laser light changes in color. The region changed in color and a region unchanged in color form an image that can be visually recognized by the user. At the data recording time, laser light is focused on the data record layer 116 based on the reflection light from the reflection layer 115 and data his recorded along the groove 118. To read the recorded data, laser light weaker than that at the recording time is applied along the groove 118 and the strength of the reflection light is detected. Likewise, to read the image drawn on the drawing layer 112, laser light of less than the predetermined strength, weaker than that at the drawing time is applied and the strength of the reflection light is detected.

Incidentally, in the present embodiment, the optical disk does not store drawn-image information regarding an image drawn on the drawing layer 112, such as image data, image position and image orientation, and does not store recording condition information regarding recording condition under which the image has been drawn on the drawing layer 112.

(1-2) General Configuration of System

Figure 2:
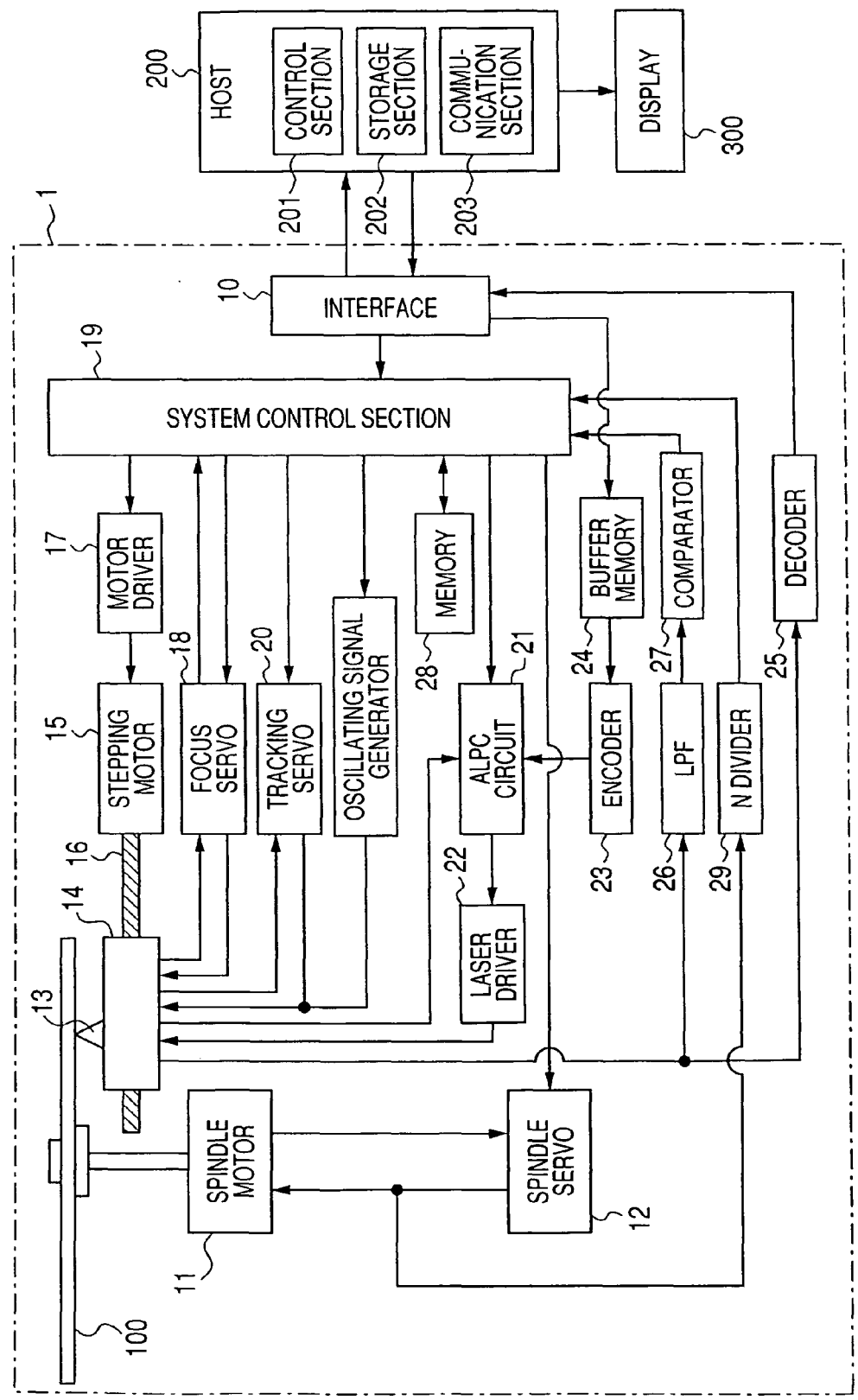
FIG. 2 is a block diagram to shown the general configuration of a system according to the first embodiment of the present invention.

A system according to the embodiment of the invention is made up of a host 200 and the optical disk recorder 1 which are connected in a state in which they can communicate with each other, as shown in FIG. 2. The optical disk recorder 1 may be incorporated in the host 200 or may be external to the host 200.

The optical disk 100 is loaded into the optical disk recorder 1. In the optical disk recorder 1, the optical disk 100 is rotated by a spindle motor 11. A spindle servo 12 controls the rotation of the spindle motor 11 at a constant linear velocity (CLV control) at the recording time and the playback time and controls the rotation of the spindle motor 11 with a constant number of revolutions (CAV control) at the drawing time and the image read time. An optical pickup 14 (optical head) is moved in the radial direction of the optical disk 100 (side-to-side direction in the figure) by a feed mechanism 16 including a feed screw, etc., driven by a stepping motor 15. A motor driver 17 drives the stepping motor 15 based on a command of a system control section 19.

A focus servo 18 performs focus control of the optical pickup 14. A tracking servo 20 performs tracking servo control of the optical pickup 14 at the recording time and the playback time. However, the tracking servo control is turned off at the drawing time and the image read time. A laser driver 22 controls the laser power to a commanded value. An ALPC (Automatic Laser Power Control) circuit 21 controls the laser power to a command value. The optical pickup 14 controls the strength of laser light 13 when the laser driver 22 drives a laser diode of the optical pickup 14 based on a command of the system control section 19 and a light reception signal from the optical pickup 14.

A oscillating signal generator 30 generates an oscillating signal at the time of drawing and reading an image to supply the oscillating signal to a tracking actuator (not shown) of the optical pickup 14, thereby oscillating the object lens 13. In this embodiment, an alternating signal, for example, a triangular signal generated in order to oscillate an irradiated position of the laser light in a diameter direction, is supplied to the tracking actuator. With this, the laser light oscillates in a diameter direction of the optical disk 100, with a larger width than a unit move amount by a one micro step operation of the optical pickup 14. This oscillating operation allows the laser light to scan the drawing layer while meandering with the larger width than the unit move amount of the optical pickup 14. In this embodiment, the optical disk recorder 1, at the time of drawing and reading an image, keeps the optical pickup 14 at the almost same position, performs the above-described oscillating operation. Moreover, the optical disk recorder 1 rotates the optical disk 100 multiple times and performs overlapping write and overlapping read of the same image. Furthermore, the number of such overlapping read is referred to as "Nr" hereinafter.

In the memory 28 are stored image read conditions pre-set for the optical recorder 1 and image read conditions settable by an operator. Such "pre-set image read conditions" include "a move amount L of the optical pickup 14 by a one full step operation of the stepping motor 15" used for output of the unit move amount that transports the optical pickup 14 in the diameter direction of the optical disk 100, and "a dividing number M of a micro step operation of the stepping motor 15." In addition, such "image read conditions settable by an operator" include "a rotation speed of the optical disk," information of various kinds of "an image read mode" combining "encode rates of image data by the encoder 23," or "a read start position R0" and "read termination position R1" in the diameter direction of the optical disk, and "the above-described number Nr of overlapping read".

An encoder 23 encodes record data into a format responsive to the format of the optical disk 100 at the data recording time. The laser driver 22 modulates laser light in response to the encoded record data and records the record data on the data record layer 116 of the optical disk 100 as pits. On the other hand, at the drawing time, the encoder 23 encodes image data to generate a pulse signal (drawing signal) with duty changing in response to the gradation data of the pixels (dots) making up the image data. The laser driver 22 modulates laser light in response to the pulse signal with duty changing and changes the visible light characteristic of the drawing layer 112 of the optical disk 100 (namely, changes the color of the drawing layer 112) for drawing according to monochrome multi-step gradation. A decoder 25 plays back data by performing EFM demodulation of the light reception signal responsive to return light received by the optical pickup 14 at the data playback time.

An LPF (low-pass filter) 26 performs low-pass filtering for the light reception signal responsive to return light received by the optical pickup 14 at the image read time. A comparator 27 makes a comparison between the level of the signal output from the LPF 26 and a predetermined threshold value and outputs a high or low pulse signal to the system control section 19 in response to the comparison result. Specifically, for example, if the level of the signal output from the LPF 26 is equal to or greater than the threshold value, the comparator 27 may output a high signal to the system control section 19; on the other hand, if the level of the signal is smaller than the threshold value, the comparator 27 may output a low signal to the system control section 19. An N divider 29 divides by N a pulse signal FG which is output from the spindle motor 11 and in which N pulses are generated per one rotation to generate a pulse signal FG' in which one pulse is generated per one rotation. The number of revolutions of the optical disk 100 can be detected based on this pulse signal FG'.

FIG. 3 is a time chart of various signals at the image read time. It is a time chart of various signals when the optical disk 100 makes one revolution. In the figure, (a) shows the waveform of a light reception signal RF output from the optical pickup 14 to the LPF 26. (b) shows the waveform of a light reception signal RF' resulting from performing low-pass filtering for the light reception signal RF and output from the LPF 26. (c) shows the waveform of a pulse signal MIR into which the light reception signal RF' is converted by the comparator 27. (d) shows the waveform of a pulse signal FG output from the spindle motor 11 to the N divider 29. (e) shows the waveform of a pulse signal FG' provided by dividing the pulse signal MIR into N pieces. As shown in (a) to (c) of FIG. 3, if the strength is equal to or greater than a predetermined threshold value, the light reception signal RF from the optical pickup 14 is set high; otherwise, the light reception signal RF is set low.

The system control section 19 determines whether the pulse signal MIR output from the comparator 27 is high or low for each predetermined dot region. Since the portion changed in color and any other portion of the image drawn on the surface of the optical disk 100 differ in reflectivity, whether or not the dot region is changed in color can be determined by referencing the strength of the reflection light. The system control section 19 writes information "1" indicating that the dot region for which the pulse signal MIR is high is not changed in color into the memory 28; on the other hand, writes information "0" indicating that the dot region for which the pulse signal MIR is low is changed in color into the memory 28.

Figure 4A:
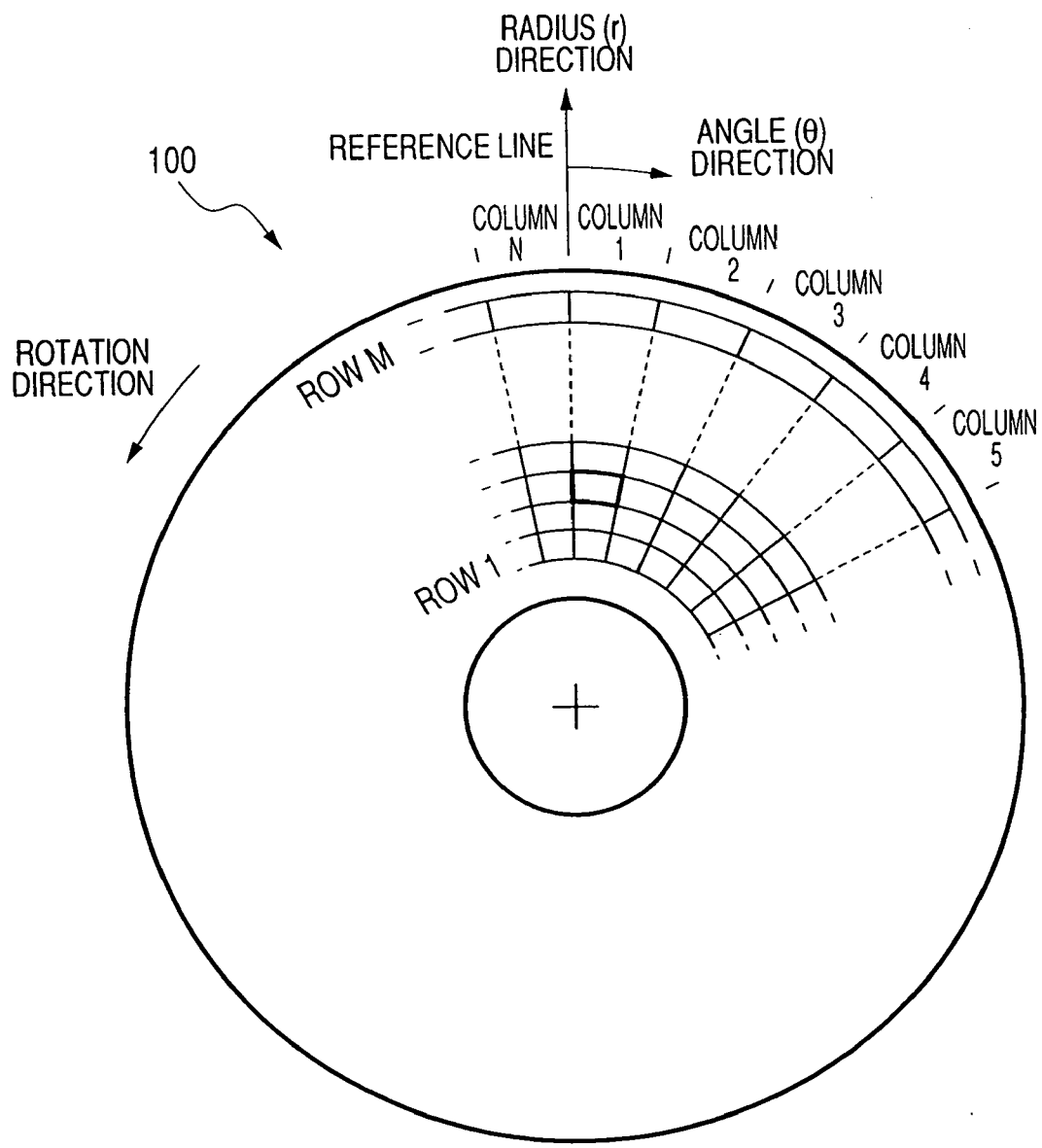
FIG. 4A and 4B are drawings to describe dots of an image to be formed on an optical disk.
Figure 4B:
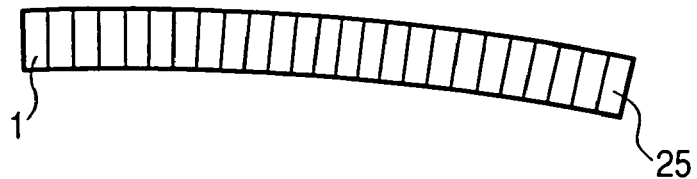

The dot region to read an image from the optical disk 100 in the embodiment will be discussed with reference to FIGS. 4A and 4B. As shown in FIG. 4A, the optical disk 100 has sectors arranged from row 1 to row m concentrically from the inner periphery to the outer periphery and further from column 1 to column n radially every given angle clockwise of the optical disk 100. Each sector has regions divided into 25 equal pieces in the circumferential direction as shown in FIG. 4B. In the embodiment, one region corresponds to one dot of an image. Therefore, in the embodiment, dots are arranged as m rows×25·n columns.

In the embodiment, a dot is white or black binary display and one byte (eight bits) is assigned as dot data indicating white or black of one dot. Here, "0" indicates a black dot; any value other than "0" indicates a white dot. The system control section determines whether or not each of the dot regions is changed in color. If the dot region is changed in color, the system control section 19 writes a signal indicating that the dot region is changed in color (in the embodiment, "0") into the memory 28. On the other hand, if the dot region is not changed in color, the system control section 19 writes a signal indicating that the dot region is not changed in color (in the embodiment, "1") into the memory 28. In the description to follow, for convenience, a "0" or "1" information group for each dot region written by the system control section 19 into the memory 28 is referred to as "pixel string data (pixel data)".

Referring again to FIG. 2, the host 200 includes a control section 201 including a CPU (Central Processing Unit), etc., a storage section 202 for storing a computer program, etc., executed by the control section 201, and a communication section 203 for transferring data to and from the optical disk recorder 1. The host 200 transmits a command of an operator to the optical disk recorder 1. The command is transmitted through an interface 10 to the system control section 19. The system control section 19 sends a command responsive to that command to each circuit of the optical disk recorder 1 for executing the corresponding operation. For example, at the data recording time, the host 200 transmits record data to the optical disk recorder 1. The record data is received at the interface 10 of the optical disk recorder 1 and is written into buffer memory 24 by the system control section 19. The system control section 19 reads the record data from the buffer memory 24 and supplies the record data to the encoder 23, which then executes the above-described encode processing and supplies the data to the laser driver 22. At the data playback time, the data played back by the decoder 25 is transferred through the interface 10 to the host 200. On the other hand, at the drawing time, the host 200 transmits image data to the optical disk recorder 1. The image data is received at the interface 10 and is written into the buffer memory 24 by the system control section 19. The system control section 19 reads the image data from the buffer memory 24 and supplies the record data to the encoder 23. On the other hand, at the image read time, the system control section 19 stores pixel string data (pixel data) in the buffer memory 24 and the stored pixel string data is transferred through the interface 10 to the host 200. A display 300 includes a liquid crystal display, etc., and is display means for displaying an image responsive to the data supplied from the host 200.

(2) Operation (2-1) Operation of Optical Disk Recorder 1

First, the operation of the optical disk recorder 1 will be discussed. When the optical disk 100 is inserted into the optical disk recorder 1, the system control section 19 determines whether or not a command for performing some processing is received from the host 200. If a command is received, the system control section 19 determines whether or not the received command is a command for performing some processing. If the command is not an image read command, the system control section 19 executes the processing specified by the command (data record operation, playback operation, or drawing operation). The data record operation and the playback operation on the optical disk 100 are the same as those performed conventionally and therefore will not be discussed again in detail.

Next, the operation when an image read operation command is given will be discussed. To perform image read, while the optical disk 100 is rotated, the optical pickup 14 is transported in sequence in the disk radial direction. First, the system control section 19 reads (acquires) the read start position R0 and the read termination position R1 from the memory 28 and positions the optical axis position in the disk radial direction of an object lens of the optical pickup 14 at the read start position R0 before the image read starts. This control is realized as follows: The stepping motor 15 is driven for once returning the optical pickup 14 in the inner peripheral direction and when detecting the original position of the innermost periphery (position detected by a limit switch or position secured mechanically by a stopper), the stepping motor 15 is driven as many steps as the object lens arrives at the read start position R0 from the position. The system control section 19 secures a pixel line data storage area for storing pixel line data in the buffer memory 24, and sets each data value of the secured pixel line data storage area to "0", thereby initializing the pixel line data storage area (step 1). Next, the system control section 19 controls the spindle servo 12 and drives the spindle motor 11 by the CAV control to rotate the optical disk 100 (step 2).

Next, the system control section 19 causes the ALPC circuit 21 to start controlling the laser power. Accordingly, the ALPC circuit 21 sets the laser power to the strength for image read. The optical pickup 14 executes laser light irradiation with the setup laser power. The system control section 19 controls the focus servo 18 for performing focus control of the optical pickup 14 (step S3).

Next, the system control section 19 moves an optic axis position in a disc radial direction of the object lens 13 of the optical pickup 14 to a position specified by the reading start position R0 stored in the memory 28 (Step S4). This control can be carried out by returning once the pickup 14 in an inner direction by driving the stepping motor 15 and, when the most inner original position (position detected by a limit switch, or a position where the optical pickup is mechanically stopped by a stopper) is detected, driving the stepping motor 15 by the number of steps for reaching the object lens 13 at the reading start portion R0 from the detected position.

When the spindle motor 11 is subjected to CAV control stably with a given number of revolutions and the optical axis position in the disk radial direction of the object lens of the optical pickup 14 has been positioned at the read start position R0, the system control section 19 monitors the pulse signal FG' output from the N divider and waits until the rising edge of the pulse signal FG' is detected (No at step 5). In this embodiment, the circumferential direction position where the rising edge of the pulse signal FG' is detected is set as θ=0. During the image read, the system control section 19 counts the number of clocks created by dividing the same crystal oscillation clock as used with the CAV control of the spindle motor 11 and detects the circumferential direction position relative to the position of θ=0 every Δθ. Δθ is a deviation angle difference between contiguously drawn pixels in the circumferential direction. The value of the deviation angle difference Δθ is found by calculation of Δθ=2π/(number of dots per round) based on the number of dots per round of the disk.

If a rising edge of the pulse signal FG' is detected (YES at step S5), the system control section 19 begins to oscillate the tracking actuator by generating an oscillating signal from the oscillating signal generator 30 (step S6). The oscillating signal generated by the oscillating signal generator 30 is supplied to the tracking actuator of the optical pickup 14. The tracking actuator oscillates the object lens 13 at a specific period in a diameter direction of the disk depending on the supplied oscillating signal. By way of setting an oscillation frequency Hz larger than a rotation number rps of the spindle, the object lens 13 oscillates over one period per one rotation. This oscillation continues until the drawing is completed. Furthermore, the tracking servo is turned off at the time of reading an image.

Upon oscillation of the object lens 13 by the oscillating signal, the system control section 19 preferably sets the values of "the oscillation frequency Hz" and "the rotation number rps" so that a value of "oscillation frequency Hz/rotation number rps" becomes circulating decimals with a long number of circulating cipher. In other words, by this setting, the irradiation positions of the laser light may not overlap each other during the overlapping read, even though the number of the overlapping read is numerous. For example, upon setting the oscillation frequency of 200 Hz for the rotation number of 131.25 rps, the value of "oscillation frequency Hz/rotation number rps" becomes circulating decimals with a long number of circulating cipher.

The system control section 19 initializes the memory access pointer for indicating an address that writes data into a pixel string data storage area of the buffer memory 24 (step S7). In this embodiment, the system control section 19 initializes the memory access pointer as an address for storing data at the circumferential direction position whit the position as θ=0. Then, the system control section 19 starts measurement of the time required for one revolution (step S8). The system control section 19 determines a level of a pulse signal MIR output from the comparator 27 (step S9). If the pulse signal MIR is in an "H" level (HIGH at step S9), the system control section 19 determines whether or not the data in the address indicated by the memory access pointer is "0" (step S10). If "0" ("0" at step S10), the system control section 19 writes "1" into the memory (step 11). Meanwhile, if otherwise ("1" at step S10) the value need not be updated, so the system control section 19 does not perform the write processing into the memory, but instead proceeds to the processing at step S12. On the other hand, at step S9, if the level of the MIR signal is in an "L" level ("LOW" at step S9), the system control section 19 does not perform the write processing into the memory, but proceeds to the processing at step S12.

Subsequently, the system control section 19 makes an increment of the memory access pointer (step S12) to determine whether the measurement time reaches the time required for one round of the disk or not (step S13). If it is determined not reach (NO at step S13), the system control section 19 returns to the processing at step S9 to perform the determination processing for gradation level of a next dot area. In the meantime, at step S13, if it is determined reach (YES at step S13), the system control section 19 determines whether or not the rotation of the spindle reaches a predetermined number (the overlapping read number Nr) (step S14). If the rotation of the spindle does not reach the predetermined number (NO at step S14), the system control section, 19 returns to the processing at step S7 to continue the read processing for an image.

In this embodiment as above, the system control section 19 determines binary gradation (white or black) in response to the output signal from the comparator 27. Accordingly, the data representing the gradation level (white or black) for each of the pixels (dots) of the image drawn on the optical disk 100 is stored in the data storage area of the buffer memory 24.

Figure 6A:
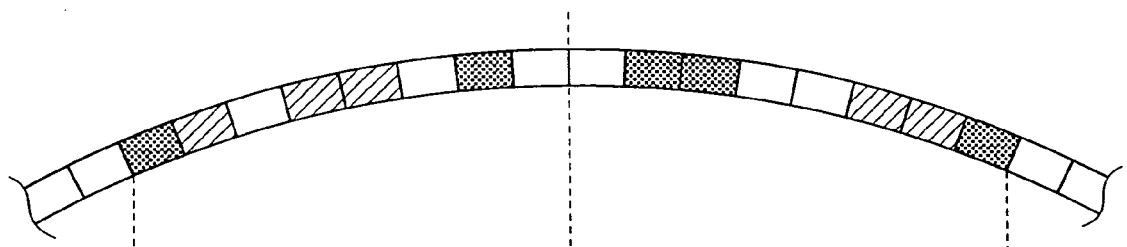
FIG. 6A and 6B are drawings to shown an example of the descriptions of data stored in buffer memory.
Figure 6B:
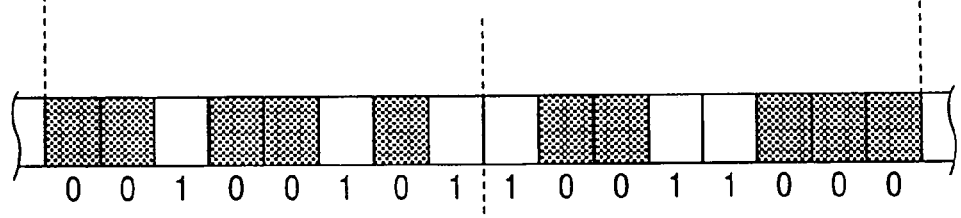

FIGS. 6A and B are diagrams to shown an example of the descriptions of data stored in the buffer memory 24. In the figure, FIG. 6A shows an image drawn on the optical disk 100; and FIG. 6B shows an example of the descriptions of data stored in the buffer memory 24. As shown in the figure, even if there is a difference in shading on the actual disk surface, if the reflectivity is equal to or greater than a predetermined reflectivity, the system control section 19 determines white ("1"); otherwise determines black ("0") and processes the data as two-color data of white and black.

In this case, as represented at step S14, the system control section 19 maintains the irradiation position (that is, a position in the diameter direction of the optical pickup 14) of the laser light in a range of constant amplitude and rotates the spindle as many as the overlapping read number Nr. After completion of the rotation as many as the number, the system control section 19 moves the irradiation position of the laser light by a predetermined distance Δr in the outer peripheral direction to repeat such procedures, that is, to maintain the irradiation position of the laser light in a range of constant amplitude and rotate the spindle as many as the overlapping read number Nr. As above, in this embodiment, the system control section 19 continues to detect the returning light to find an OR of the pulse signal MIR for each rotation, in the radius position of the disk for detecting an image during the time period of the rotation of the spindle motor as many as the predetermined number (the overlapping read number Nr in this embodiment) Furthermore, it restricts an overlap of paths of the detected light at the minimum to detect more finely, by oscillating the tracking actuator in a radial.

At step S14, if it is determined that the rotation of the spindle reaches the predetermined number Nr (YES at step S14), the system control section 19 determines whether the spindle reaches an outer peripheral radius for image read or not (step S15). If it is determined that the spindle does not reach the outer peripheral radius for image read (NO at step S15), the system control section 19 returns to the processing at step S4. Meanwhile, at step S15, if it is determined that the spindle reaches the outer peripheral radius for image-read (YES at step S15), the system control section 19 terminates the oscillation of the tracking actuator (step S16).

That is to say, the system control section 19 performs the movement of the distance $\Delta r$ each time $\theta$ reaches $2\pi \times Nr$. If $\theta$ reaches $2\pi \times Nr$, the system control section 19 drives the stepping motor 15 one microstep for moving the optical axis position of the optical pickup 14 by the distance $\Delta r$ in the disk outer peripheral direction. $\Delta r$ is the unit transportation width in the diameter direction of the optical pickup 14, namely, the move amount of the optical pickup 14 according to one microstep of the stepping motor 15. The value of $\Delta r$ is a value based on a command from the host 200. Thus, the system control section 19 gradually varies the radial position for measurement, and if the position in the disk radial direction reaches the read termination position R1, the system control section 19 terminates the image read processing.

By the repeated processing of step S4 to step S15, the pixel string data representing an image drawn on the label side of the optical disk 100 is stored in the buffer memory 24. Upon the completion of processing to step S16, the system control section 19 transmits the data stored in the buffer memory 24 to the host 200. In so doing, the image drawn on the optical disk 100 is read and the pixel string data, for each round representing the read image is transmitted to the host 200. Upon completion of reception of all the pixel string data, the host 200 uses the acquired pixel string data to reproduce the drawing side on the display 300.

Figure 7:
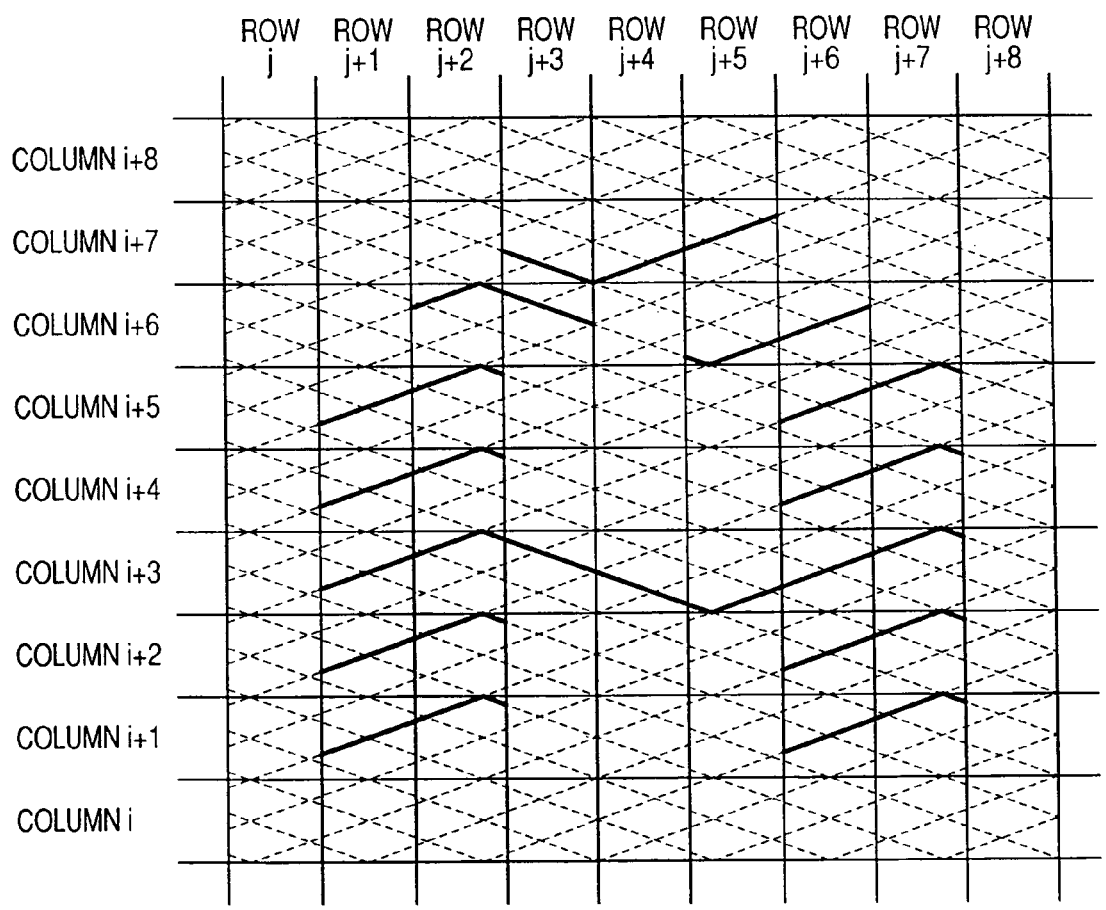
FIG. 7 is a drawing to show an example of an image drawn on the optical disk.

Herein, the operation for controlling the tracking actuator so as to oscillate the irradiation position of the laser light will be described with reference to figures, compared with a case of reading an image without oscillating. FIG. 7 is a diagram to show an example of an image drawn on the optical disk 100. For convenience of explanation, FIG. 7 shows circumferences of the optical disk 100 unfolded by straight lines. The example shown in FIG. 7 is an image drawn by the optical disk recorder 1 according to this embodiment, and, as shown in figures, drawn lines (irradiation paths of the laser light) are drawn meandering.

Figure 8A:
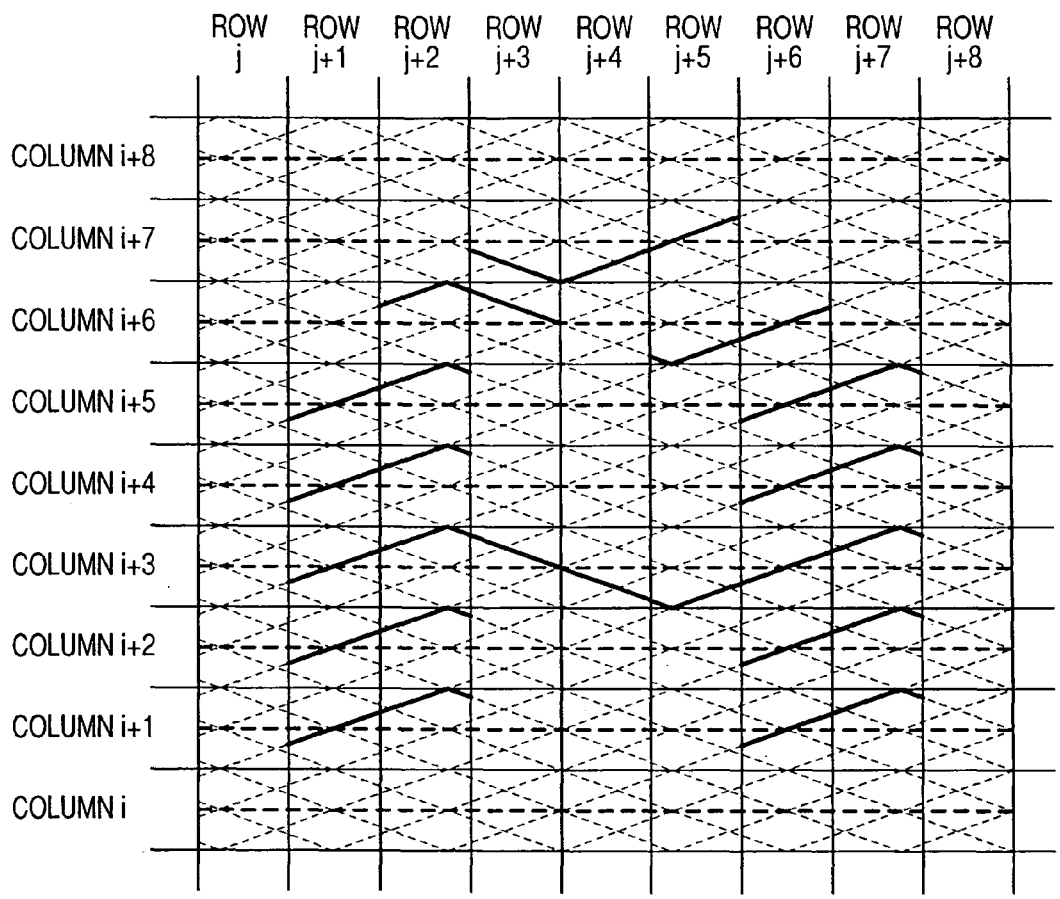
FIGS. 8A and 8B are drawings to describe processing in a case of performing an image read not oscillating the irradiation position.
Figure 8B:
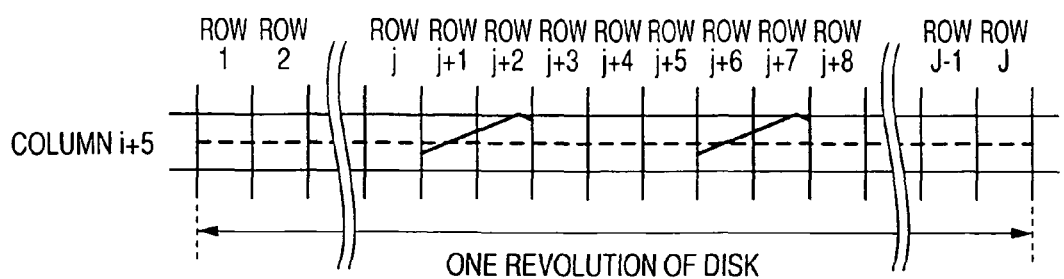
Figure 9:
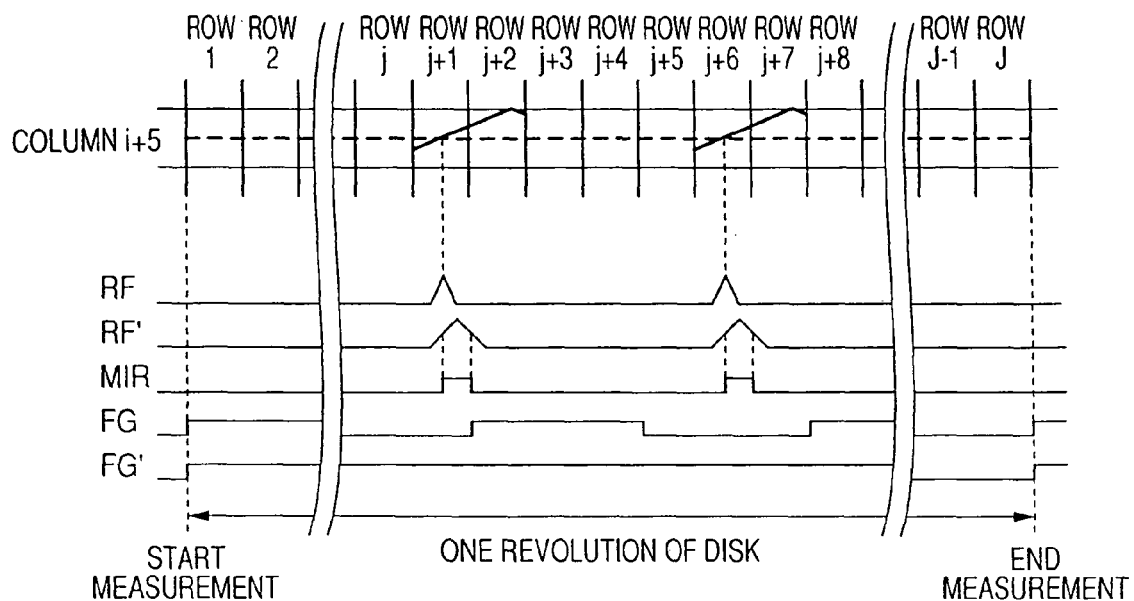
FIG. 9 is a drawing to describe processing in a case of performing an image read not oscillating the irradiation position.

FIG. 8A is a diagram to show paths of the laser light at the time of reading an image in a case of not oscillating the irradiation position. Dotted lines in the figure represent paths of the laser light at the reading time. FIG. 8B shows the number of one circumference of the disk as J, only extracting the row (i+5) shown in FIG. 8A, for easy understanding. Moreover, FIG. 9 shows the respective waveforms when the laser light passes through the drawn image (shown by straight lines) shown in FIG. 8B. In the figure, the pulse signal MIR represents the image on the disk to some degree; however, an original image sometimes needs to be reproduced more finely. In such case, the method according to this embodiment is available.

Figure 10:
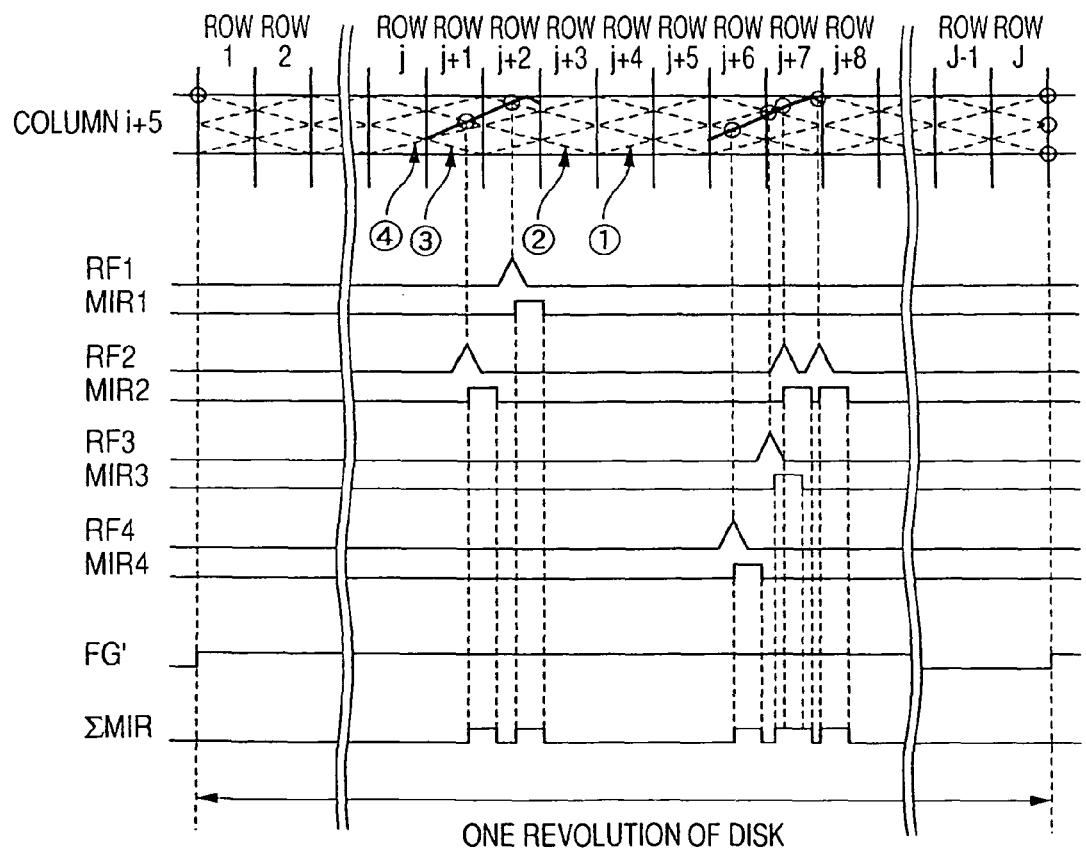
FIG. 10 is a drawing to describe an image read processing according to the present embodiment.
Figure 11:
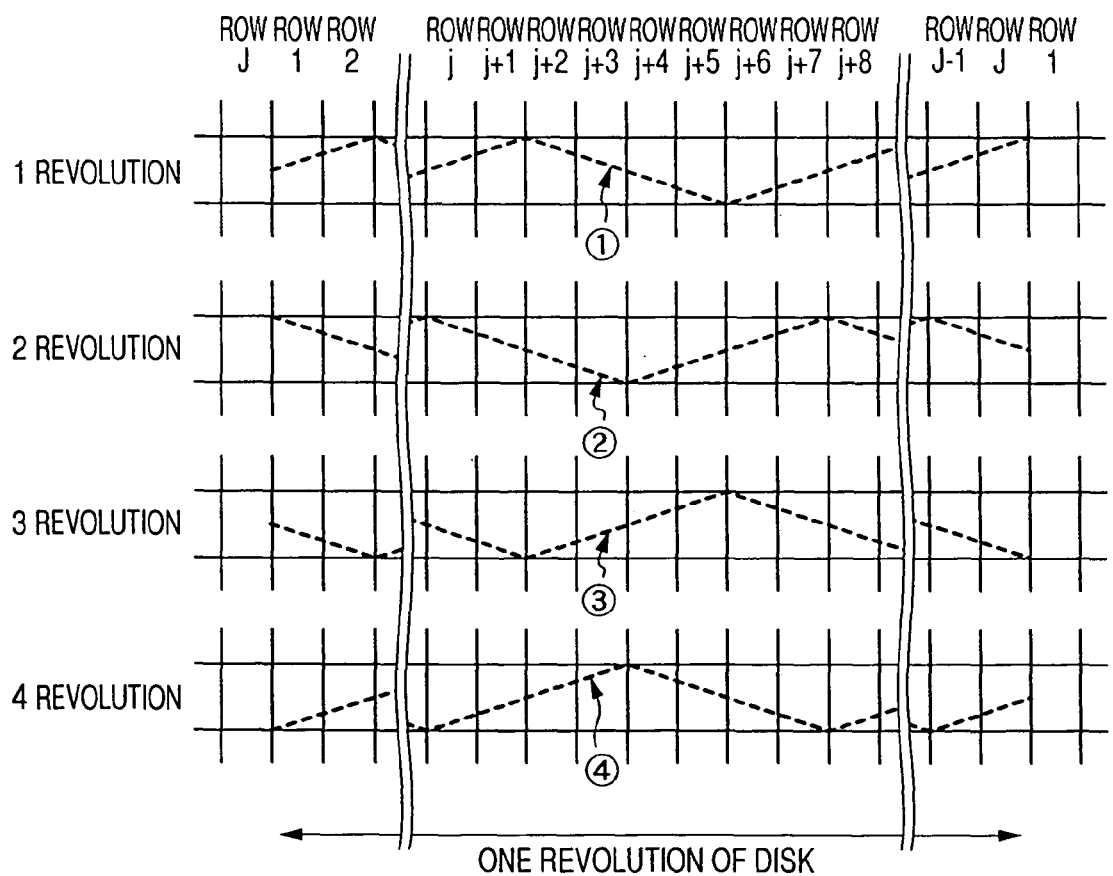
FIG. 11 is a drawing to describe an image read processing according to the present embodiment.

FIG. 10 is a diagram to show an example of paths of irradiation position of the laser light in one radial direction position in a case of setting the overlapping read number Nr as "4". For convenience of explanation, FIGS. 8A and 8B show circumferences of the optical disk 100 unfolded by straight lines. According to FIG. 10, the laser light by the oscillation operation scans a range of the disk radial direction wider than the move amount $\Delta r$ of the optical pickup 14 by one microstep. In addition, since the value of "oscillation frequency Hz/rotation number rps" is set to become circulating decimals, paths of the laser light do not overlap each other every rotation of circumference. Thus, even though a separate read area is narrow, finer image read is realized. As clear if comparing FIG. 9 and FIG. 10, the optical disk reader 1 associated with the present embodiment can read an image more finely than the example shown in FIG. 9. Even though the example shown in FIG. 10 shows overlapping the paths of the spindle of 4 revolutions, FIG. 11 shows dividing for the spindle of each one circumference. As shown in FIG. 11, upon determination of a rotation number of the spindle and an oscillation number of the tracking actuator so that the path of the laser light for each circumference does not overlap, it is possible to detect an image more precisely.

As above, in this embodiment, since the tracking actuator is controlled so that the irradiation position of the laser light oscillates in the radial direction, it is possible to reproduce an image more precisely. For example, in a case of a tracking mismatch at the drawing time, a path of the laser light at the drawing time and one of the laser light at the reading time are not crossed, so an image cannot be sometimes read, upon performance of image read without oscillating the laser light. On the contrary, in this embodiment, since the irradiation position of the laser light oscillates, even in a case of a tracking mismatch in a specific range, the irradiation position of the laser light oscillates in the specific range to cross the drawing line in part at least, thereby reading an image more precisely than the conventional.

Although the above-described embodiment generates an alternating signal, for example, a triangular signal so that the irradiation position of the laser light oscillates in the radial direction, as an oscillating signal at the reading time, it is sufficient as an oscillating signal that an irradiation path of the laser light oscillates in a radial direction to cross the groove 102 of the rotating optical disk 100. Accordingly, as an oscillating signal, many kinds of alternating signals such as a sinusoidal wave including the triangular signal may be supplied. As above, the oscillating signal generator 30 may generate an oscillating signal with constant amplitude and frequency and with different phase for each revolution, When the optical disk 100 makes multiple revolutions.

Second Embodiment

Figure 12:
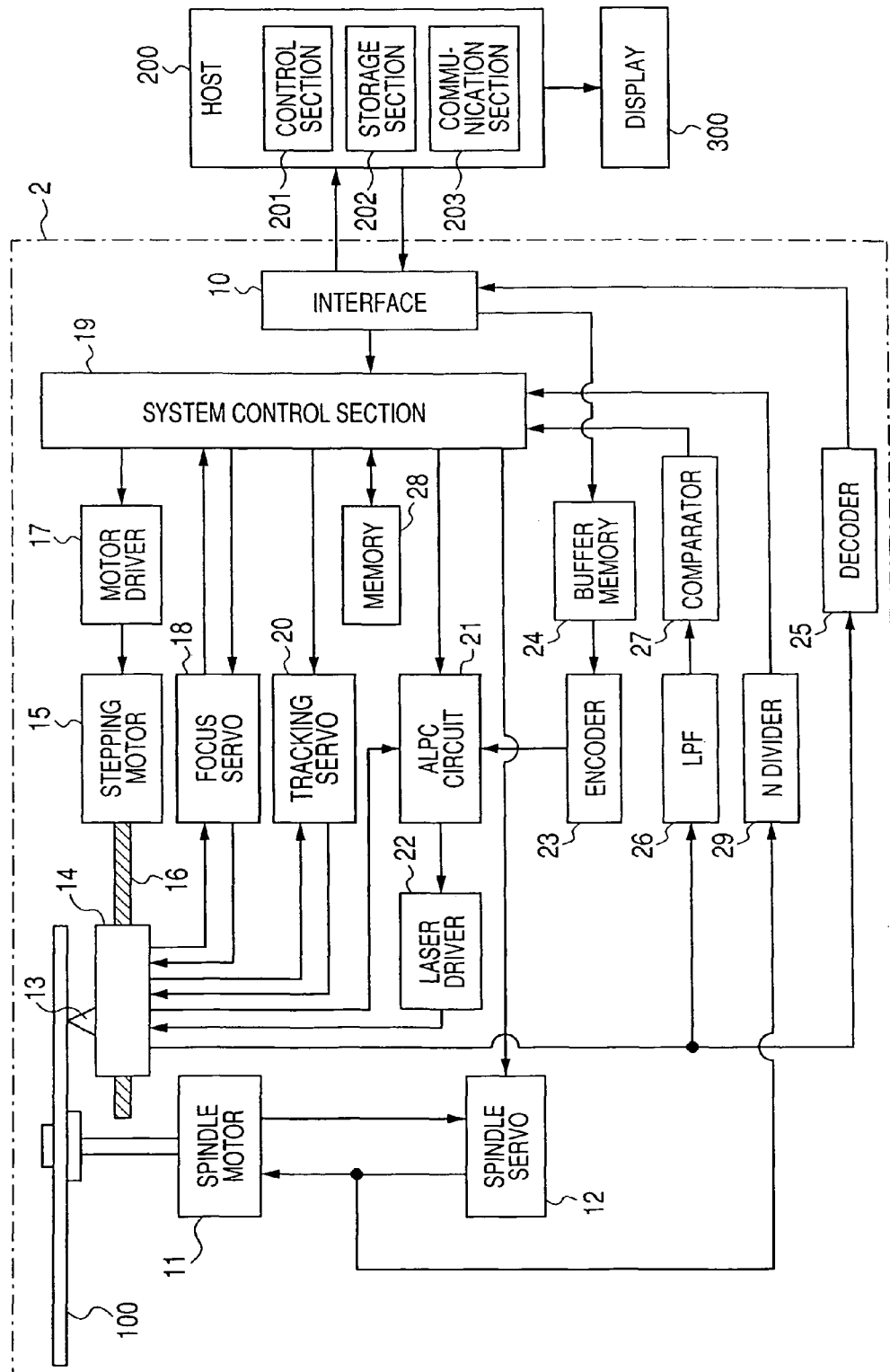
FIG. 12 is a block diagram to shown the general configuration of a system according to a second embodiment of the present invention.
Figure 13:
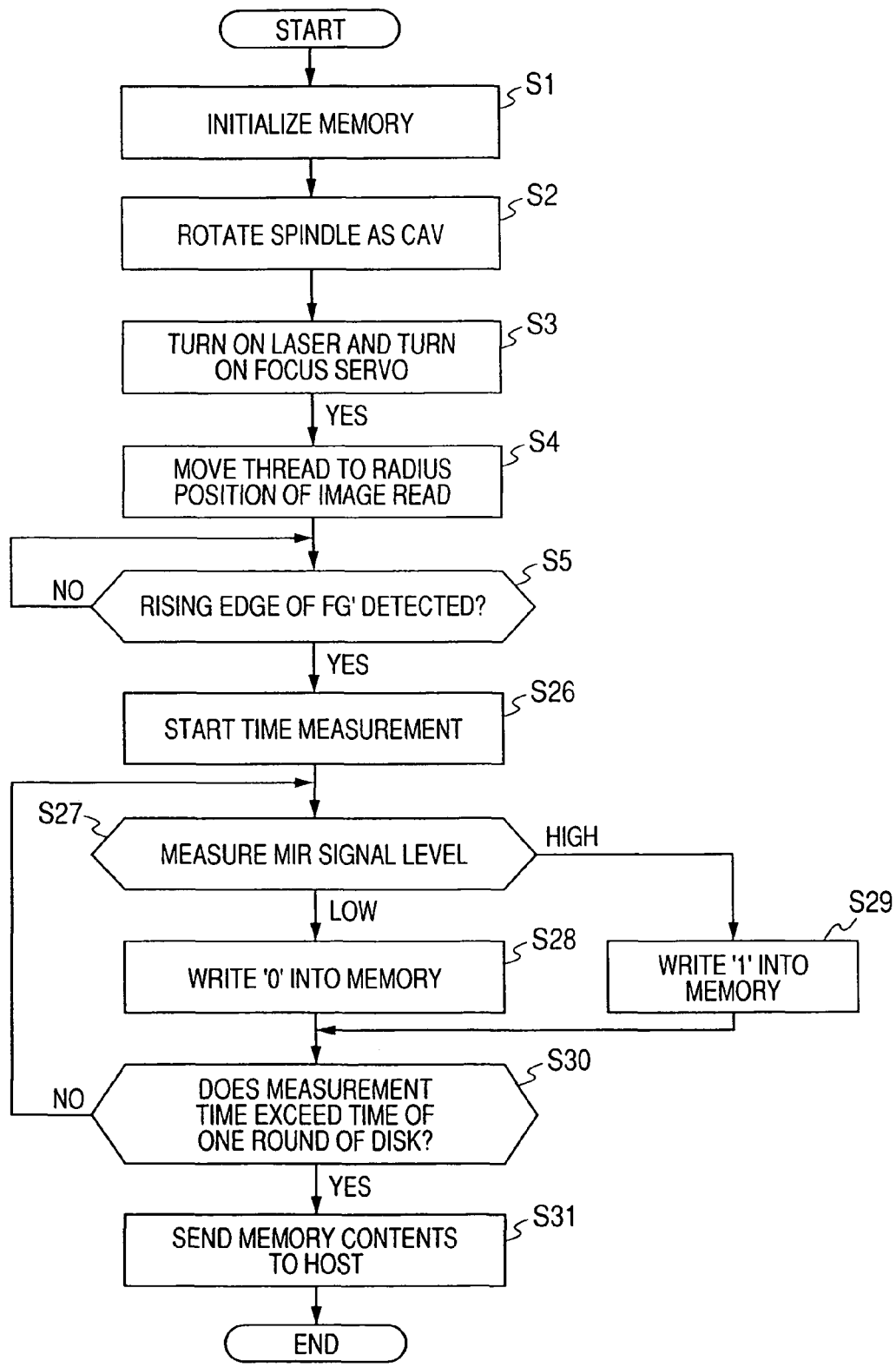
FIG. 13 is a flow chart to show processing executed by the system control section according to the second embodiment.

In the first embodiment, the optical disk recorder 1 is provided with the oscillating signal generator 30 for generating the oscillating signal at the time of drawing and reading the image to supply the oscillating signal to the tracking actuator. However, this oscillating signal generator may not be provided in the optical disk recorder 1. A second embodiment in which this oscillating signal generator is not provided in the optical disk recorder 2 will be described with reference to FIGS. 12 and 13. FIG. 12 is a block diagram to shown the general configuration of a system according to a second embodiment of the present invention, and FIG. 13 is a flow chart to show processing executed by the system control section according to the second embodiment. The second embodiment is substantially the same as the first embodiment in other structures, and so, members corresponding to those members in the first embodiment are denoted with the same reference numerals, and their detailed description will be omitted.

As shown in FIG. 12, the optical disk recorder 2 according to the second embodiment is not provided with the oscillating signal generator and is provided with other elements in the optical disk recorder 1 according to the first embodiment other than the oscillating signal generator.

The operation of the optical disk recorder 2 according to the second embodiment will be described with reference to FIG. 13.

Figure 5:
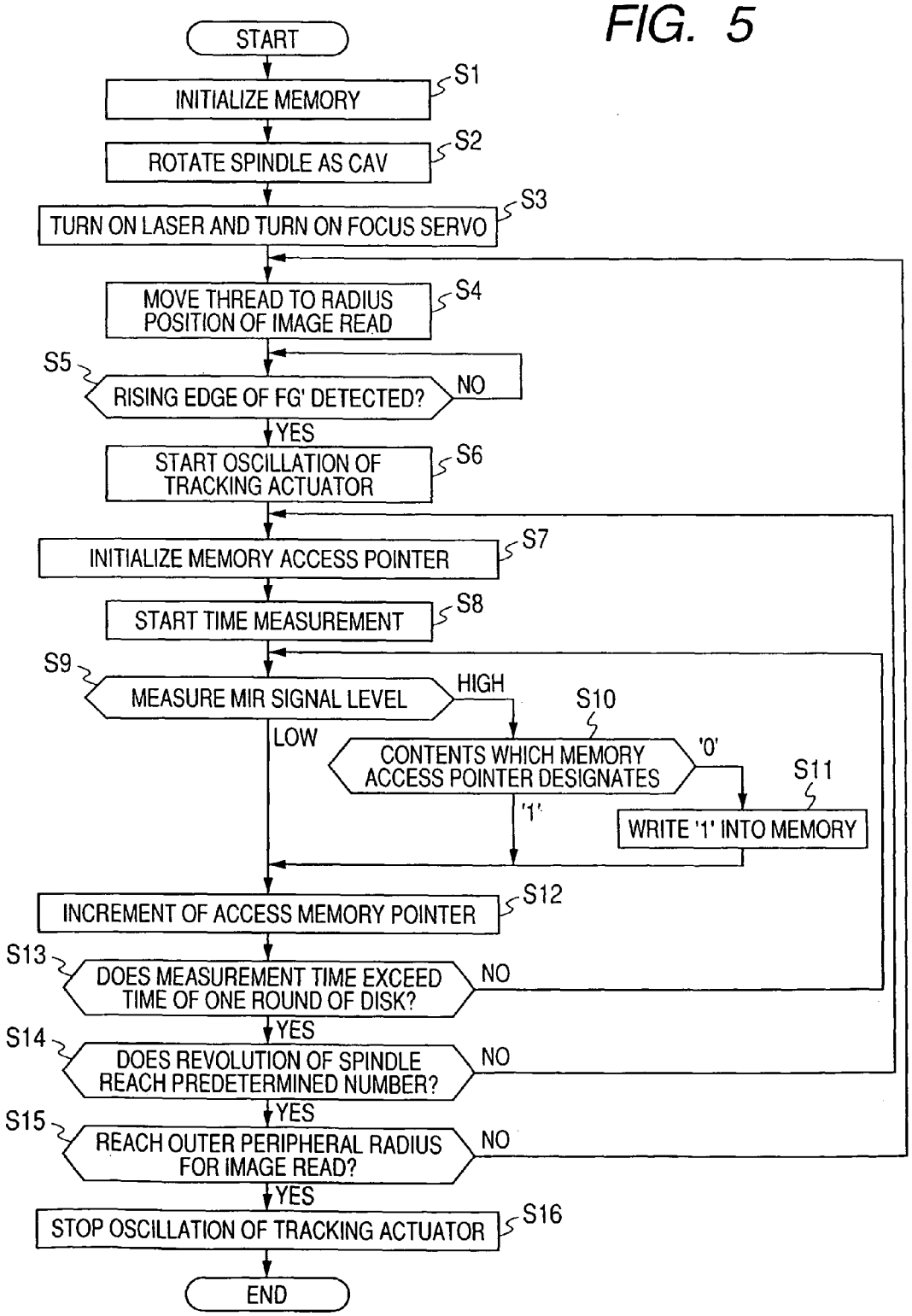
FIG. 5 is a flow chart to show processing executed by the system control section according to the first embodiment.

Steps 1 to S5 in FIG. 13 are same as the steps 1 to S5 in FIG. 5 according to the first embodiment. Thus, the description thereof is omitted.

Upon detection of the rising edge of the pulse signal FG' (YES at step S5), the system control section 19 starts measurement of the time required for one revolution (step S26). If a pulse signal MIR output from the comparator 27 is high (HIGH at step S27), the system control section 19 writes "1" into the buffer memory 24 (step S29). On the other hand, if the pulse signal MIR output from the comparator 27 is low (LOW at step S27), the system control section 19 writes "0" into the buffer memory 24 (step S28).

Next, the system control section 19 converts the data stored in the buffer memory 24 into a data string starting at the reference angle and transfers the data string to the host 200 in accordance with a predetermined protocol.

The system control section 19 determines whether or not the Measurement time exceeds the time required for one round of the disk (step S30). If the system control section 19 determines that the measurement time exceeds the required time (YES at step S30), it transfers the data stored in the buffer memory 24 to the host 200 (step S31). On the other hand, if the system control section 19 does not determine that the measurement time exceeds the required time (NO at step S30), it returns to step S7 and continues the image read (steps S7 to S30).

Steps S27 to S30 are repeated, whereby the image data as much as one round of the optical disk 100 is stored in the buffer memory 24.

The system control section 19 moves distance Δr each time θ reaches 2π. If θ reaches 2π, the system control section 19 drives the stepping motor 15 one microstep for moving the optical axis position of the optical pickup 14 by distance Δr in the disk outer peripheral direction. Δr is the unit feed width in the disk radial direction of the optical pickup 14, namely, the move amount of the optical pickup 14 according to one microstep of the stepping motor 15. The value of Δr is a value based on a command from the host 200. Thus, the system control section 19 gradually changes the radial position for measurement and if the position in the disk radial direction reaches the read termination position R1, the system control section 19 terminates the image read processing.

As described above, when the optical axis position of the object lens of the optical pickup 14 exists at any position (r, θ) on the optical disk 100, position control processing of the optical axis positions in the disk circumferential direction and the disk radial direction of the object lens, and the comparison processing of the comparator 27 are performed based on the same crystal oscillation clock so as to read the gradation level of the position and thus they are easily synchronized with each other.

Operation of System

Next, the operation of the system will be discussed.

If the operator performs operation for reading the image drawn on the optical disk 100, the host 200 first acquires the feed width and the upper limit value of the sampling resolution per revolution from the optical disk recorder 1, 2. The optical disk recorder 1, 2 transmits "feed width N" and "upper limit value P of sampling resolution per revolution" stored in the memory 28 in response to a command of the host 200 to the host 200.

The host 200 determines parameters at the measurement time (the number of samplings (number of dots) per round S and radial feed width Δr) in response to the feed width N and the upper limit value P of sampling resolution per revolution received from the optical disk recorder 1, 2. For rotating the disk at the constant angular velocity, the number of samplings per round does not change between the inner and outer peripheries of the disk surface and thus the sampling interval becomes longer as it approaches the outer periphery and the read accuracy becomes coarse. Thus, preferably the number of samplings is set so as to provide a sufficient resolution even in the outer peripheral portion. If the radial feed width is set too large, the accuracy becomes coarse at the image reproducing time and a sufficient resolution may be unable to be provided. Thus, preferably an appropriate feed width is set in conformity with the display.

Subsequently, the host 200 transmits a request for the radius position to start image read to the optical disk recorder 1, 2. The optical disk recorder 1, 2 transmits the pixel string data corresponding to just one revolution from the reference angle at the radius position indicated by the request received from the host 200 once or separately twice or more. This processing is the processing previously described with reference to FIG. 5 and FIG. 13 and therefore will not be discussed again.

The host 200 acquires the pixel string data corresponding to one revolution read by the optical disk recorder 1, 2 once or separately twice or more. As the request sent from the host 200 to the optical disk recorder 1, 2, an existing data read command may be used or a dedicated acquisition command or transfer protocol may be defined.

Next, the host 200 requests the optical disk recorder 1, 2 to send the pixel string data corresponding to one revolution at the position resulting from advancing the radius position by width Δr in the outer peripheral direction.

Upon reception of the request, the optical disk recorder 1, 2 acquires the pixel string data from the position. After this, the pixel string data is acquired in sequence in a similar manner until the outermost periphery of the disk or the specified radius position is reached. Thus, the image drawn on the optical disk 100 is read and the pixel string data for each round representing the read image is transmitted to the host 200.

Figure 14:
FIG. 14 is a drawing to show an example of an image drawn on the optical disk.
Figure 15:
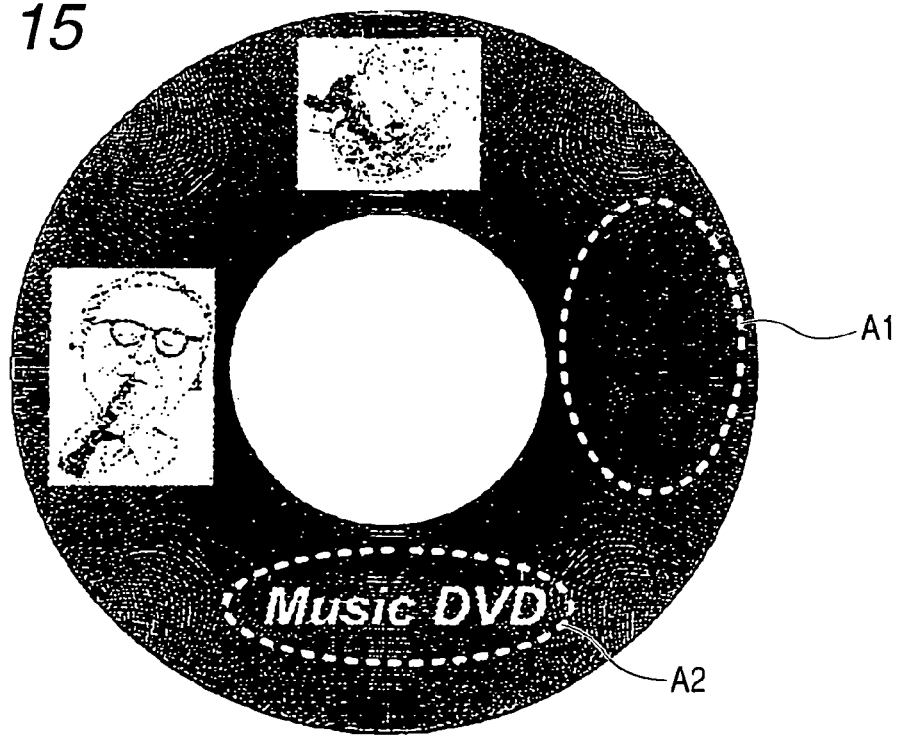
FIG. 15 is a drawing to show an example of an image displayed on a display section of a host.

Upon completion of reception of all the pixel string data, the host 200 uses the acquired pixel string data to reproduce the drawing side on the display 300. An example of the image drawn on the optical disk 100 and an example of the image read in the optical disk recorder 1, 2 are shown in FIGS. 14 and 15. FIG. 14 is a drawing to show an example of the image drawn on the optical disk 100 and FIG. 15 is a drawing to show an example of the image displayed on the display 300.

By the way, to edit the image drawn on the optical disk 100, hitherto, it has been necessary to previously store the image data drawn on the optical disk 100 in the host 200, on the data side of the optical disk 100, etc., as auxiliary information and manage the data (information) in association with the drawing side. In contrast, in the embodiment, the optical disk 100 is irradiated with laser light and light and shade information is acquired according to the reflection light, so that the image drawn on the optical disk 100 can be grasped without auxiliary information.

A non-drawing region can also be detected in the optical disk 100 and accordingly another image can also be drawn in the detected non-drawing region. Specifically, for example, a non-drawing portion is detected and another picture or character can also be drawn in an empty region. In the example shown in FIG. 8, it is seen that noting is drawn in a region A1. Therefore, if a new image is drawn at the position of the region A1 by aligning the position with reference to the reference angle, a new image pattern not overlapping the former image can be formed on the optical disk 100. For example, when using the optical disk 100 in such a manner that content (for example, an about 30-minute animation, etc.,) is added to the data side of the disk in sequence, this method makes it possible to add a character string or an image (thumbnail or date information) responsive to the content as required in an empty region of the label side (region in which no image is drawn).

In this case, an empty region of the optical disk 100 (region in which no image is drawn) is extracted and if two or more empty regions exist, the system control section 19 may determine the size of each region and may determine the region in which the added image is to be drawn. Specifically, if the user performs operation for drawing one image on the optical disk 100, the system control section 19 determines the size of each region of the optical disk 100 and determines which empty region to draw the image in response to the determination result and the size of the new drawn image.

MODIFIED EXAMPLES

Figure 16:
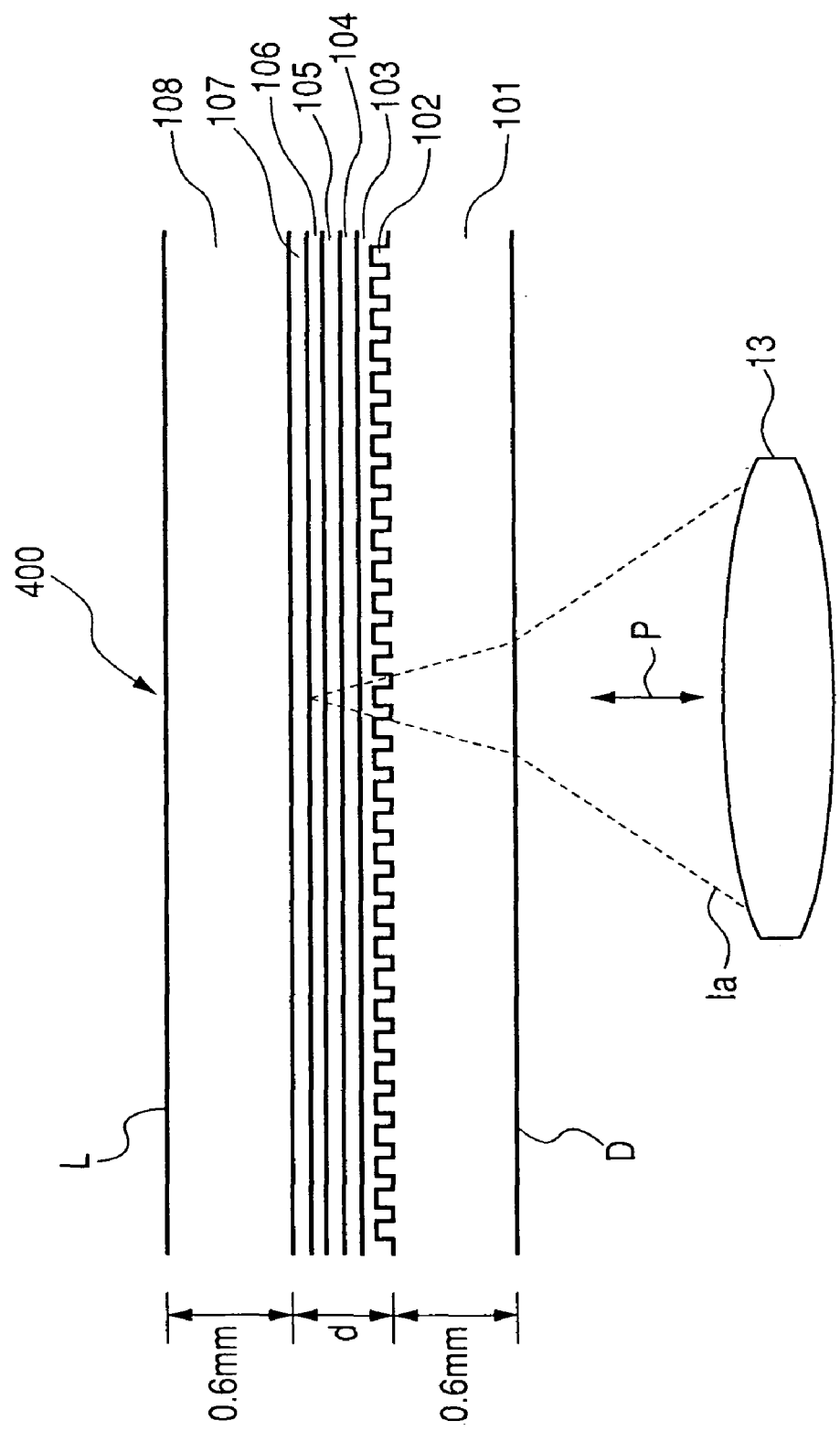
FIG. 16 is a sectional view of another optical disk.

While the first and second embodiments of the invention have been described, it is to be understood that the invention is not limited to the embodiments described above and can be embodied in other various forms. Modified examples of the invention are shown below:

1. An optical disk 400 shown in FIG. 16 may be also used. The optical disk 400 is an optical disk of DVD-R, CD-R, CD-R/DVD-R mix type, for example. As shown in FIG. 16, on the optical disk 400, a polycarbonate layer 101, a data record layer 103, a translucent layer 104, an intermediate layer 105, a drawing layer 106, a translucent layer 107 and a polycarbonate layer 108 are arranged in order from a recording surface D to a label surface L. The thickness of the optical disk 400 is about 1.2 (mm) and the polycarbonate layer 101 and the polycarbonate layer 108 occupy each about 0.6 (mm) of the thickness and a thickness d from the data record layer 103 to the translucent layer 107 is minute as compared with the whole thickness.

The record side D of the data record layer 103 is formed with a spiral groove (guide-groove) 102. At the data recording time, the position of the object lens 13 is adjusted to a proper position in an arrow P direction and laser light is focused on the data record layer 103 based on the reflection light from the translucent layer 104 and data is recorded along the groove 118. Then, laser light having power corresponding to data to be recorded is emitted along the groove 102 of the data record layer 103. At this time, a pit corresponding to a data length is formed at a portion where the layer light is emitted, thereby recording the data. Incidentally, when reading out and reproducing the recorded data, laser light weaker than that at the recording time is applied along the groove 102 and the strength of the reflection light is detected, thereby realizing the data reproducing.

The drawing layer 106 is formed of a substance changed in color when it is irradiated with laser light of a predetermined strength or more. At the drawing time, the position of the object lens 13 is adjusted to a proper position in an arrow P direction and the laser light 1a is focused on the drawing layer 106 based on the reflection light from the translucent layer 107. Upon irradiation with laser light of a predetermined strength or more, the region of the drawing layer 106 irradiated with the laser light changes in color. The region changed in color and a region unchanged in color form an image that can be visually recognized by the user. Incidentally, FIG. 16 shows a case where the laser light 1a is focused on the drawing layer 106. To reading the drawn image, laser light of less than the predetermined strength, weaker than that at the drawing time is applied and the strength of the reflection light is detected, thereby realizing the image reading.

2. The drawing layer 112 of the optical disk 100 may be a layer changed in color in response to at least either heat or light. The position of the drawing layer in the optical disk 100 is not limited to that shown in FIG. 1 and may be provided at a position different from the data record layer (different in the distance from the record side or the label side of the optical disk 100). Although the optical disk 100 is provided from various manufactures, it is considered that the characteristics of the record layer and the drawing layer vary from one manufacturer to another. For example, if the heat absorptivity of the data record layer differs, it is also estimated that the level of laser light to be applied for forming a pit and the level of laser light to be applied for changing color differ. The same comment also applies to the drawing layer. Thus, it is also advisable to previously actually perform data storage and drawing on optical disks 100 of a large number of manufacturers, find what level of laser light is to be applied appropriately, and store the values in the memory. In this case, if each value is previously stored in association with identification information indicating the type of optical disk 100 (disk ID information), the disk ID information of the set optical disk 100 can be read and then laser light irradiation responsive to the disk type can be executed.

3. In the embodiment, the circumferential direction position to start the image read is set to $\theta=0$. Instead, however, a specific recognition code can be formed on the inner peripheral side from the image read area of the optical disk 100, the circumferential direction position of the recognition code can be detected with the optical pickup 14 before image read, and the image read can be started at the circumferential direction position with the position defined as $\theta=0$. In so doing, if the optical disk 100 is detached from and attached to the optical disk recorder 1, the position of $\theta=0$ does not change and thus the image read can be continued.

4. In the embodiment described above, the optical disk 100 is rotated with the constant angular velocity, but may be rotated with constant linear velocity. To rotate the optical disk 100 with the constant angular velocity, the length of the pixel string data per revolution is uniquely determined according to the number of samplings independently of the radius position. On the other hand, to rotate the optical disk 100 with the constant linear velocity, the length of the pixel string data per revolution becomes longer as the radius position approaches the outer periphery.

5. In the embodiment described above, the gradation data on the circumference of the optical disk 100 is sampled and is binarized and the image is read at two-step gradation. The number of gradation levels is not limited to two; it may be three or more. In this case, for example, the optical disk may be rotated more than once while the threshold value used for determination is changed for each rotation, and the gradation level may be determined in response to the determination result with two or more threshold values. For example, using a plurality of comparators different in threshold value, the gradation level may be determined in response to the output values of the comparators.

The larger the number of samplings per revolution, the higher is the resolution and the higher is the reproducibility of the image. The finer the radial feed width, the higher is the resolution. However, to increase the number of samplings, the rotation speed needs to be set to low speed and the finer the feed width, the longer is the time taken for read. Therefore, preferably appropriate rotation speed and feed width are selected in conformity with the purpose, etc.

6. In the embodiment described above, a visible image drawn on the optical disk 100 is read, but the image to be read by the optical disk recorder 1 is not limited to a visible image; for example, an invisible image written by an infrared ray can also be read. Also in this case, the optical disk 100 may be irradiated with laser light and the gradation level (for example, white or black) of each dot region on the optical disk 100 may be determined in response to the reflection light amount.

7. In the embodiment described above, the read start position R0 and the read termination position R1 in the radial direction of the optical disk 100 are previously stored in the memory 28 of the optical disk recorder 1 and the system control section 19 reads the read start position R0 and the read termination position R1 from the memory 28. Instead, the host 200 may specify the read start position R0 and the read termination position R1 in the radial direction of the optical disk 100 for the optical disk recorder 1. In this case, the optical disk recorder 1 may read the image of the optical disk 100 in the specified range.

8. In the embodiment described above, the host 200 specifies the unit move amount Δr of the optical pickup 14 for the optical disk recorder 1 and the system control section 19 moves the optical pickup 14 distance Δr at a time in the disk outer peripheral direction. Instead, the unit move amount Δr of the optical pickup 14 may be previously stored in the memory 28 of the optical disk recorder 1.

In the embodiment described above, the host 200 specifies the number of dots S per round of the optical disk 100 for the optical disk recorder 1. Instead, however, the number of dots per round may be previously stored in the memory 28.

9. In the embodiment described above, unrewritable optical disks of a CD-R, etc., are used, but rewritable optical disks of a CD-RW, a DVD-RW, a CD/DVD-RW, etc., may be used. To use such a rewritable optical disk, a part of detected image information can also be edited and written back to the optical disk. In so doing, partial rewrite of the drawing side can be realized.

Specifically, in the example shown in FIGS. 14 and 15, it is seen that a character string of "Music DVD" is drawn at the position of a region A2 from the image reproduced based on path. If an image can be rewritten as with an RW disk, the character string in the portion can also be changed to another character string. That is, a reproduced image having a sufficiently high resolution is generated and the portion corresponding to the character string is rewritten using image edit software, etc., and the image is again drawn on the disk, whereby partial rewrite of the image can be realized.

10. In the embodiment described above, one byte is assigned per sample (dot), but one bit may be assigned per sample (dot). In this case, preferably the number of samplings per round is a multiple of 8.

11. The program executed by the control section 201 of the host 200 can be provided in a state in which it is recorded on a record medium such as magnetic tape, a magnetic disk, a flexible disk, an optical record medium, a magneto-optical record medium, RAM, or ROM. The program can also be downloaded into the host 200 via a network such as the Internet.

What is claimed is:

1. An image reader comprising:
   a rotation unit that rotates an optical disk;
   an irradiation unit that is movable in a radial direction of the optical disk and irradiates the optical disk rotated by the rotation unit with laser light;
   a feeding unit that transports the irradiation unit in the radial direction while the rotation unit rotates the optical disk;
   a gradation level determination unit that receives reflection light of the laser light applied to the optical disk by the irradiation unit and determines a gradation level for each predetermined dot region along a circumferential direction of the optical disk in response to an amount of the received reflection light;
   an output unit that outputs pixel data indicating the gradation level for each dot region determined by the gradation level determination unit; and
   a position information acquisition unit that acquires position information indicating a read start position and a read termination position in the radial direction of the optical disk,
   wherein the feeding unit transports the irradiation unit from the read start position to the read termination position indicated by the position information acquired by the position information acquisition unit by a predetermined feed width in the radial direction each time the optical disk makes one revolution, and
   wherein the gradation level determination unit receives the reflection light of the laser light applied to the optical disk by the irradiation unit over a time period during which the optical disk makes one revolution.

2. The image reader according to claim 1 further comprising a feed width information storage that stores feed width information indicating the feed width,
   wherein the feeding unit transports the irradiation unit from the read start position to the read termination position by the feed width indicated by the feed width information stored in the feed width information storage in the radial direction each time the optical disk makes one revolution.

3. The image reader according to claim 1 further comprising a feed width information acquisition unit that acquires feed width information indicating the feed width,
   wherein the feeding unit transports the irradiation unit from the read start position to the read termination position by the feed width indicated by the feed width information acquired by the feed width information acquisition unit in the radial direction each time the optical disk makes one revolution.

4. The image reader according to claim 1 further comprising a dot region information storage that stores dot region information indicating the dot region,
   wherein the gradation level determination unit receives reflection light of the laser light applied to the optical disk by the irradiation unit and determines the gradation level for each dot region indicated by the dot region information stored in the dot region information storage in response to the amount of the received reflection light.

5. The image reader according to claim 1 further comprising a dot region information acquisition unit that acquires dot region information indicating the dot region,
   wherein the gradation level determination unit receives reflection light of the laser light applied to the optical disk by the irradiation unit and determines the gradation level for each dot region indicated by the dot region information acquired by the dot region information acquisition unit in response to the amount of the received reflection light.

6. An image reader comprising:

a rotation unit that rotates an optical disk;

an irradiation unit that is movable in a radial direction of the optical disk and irradiates the optical disk rotated by the rotation unit with laser light;

a feeding unit that transports the irradiation unit in the radial direction while the rotation unit rotates the optical disk;

a gradation level determination unit that receives reflection light of the laser light applied to the optical disk by the irradiation unit and determines a gradation level for each predetermined dot region along a circumferential direction of the optical disk in response to an amount of the received reflection light;

an output unit that outputs pixel data indicating the gradation level for each dot region determined by the gradation level determination unit; and an irradiation position controller that oscillates an irradiated position of the laser light in the radial direction, wherein the gradation level determination unit receives the reflection light of the laser light applied by the irradiation unit and oscillated by the irradiation position controller, wherein the feed unit transports the irradiation unit transports the irradiation unit by a distance corresponding to a pitch in the radial direction of the dot arrangement in a substantially radial direction of the optical disk each time the optical disk makes multiple revolutions, wherein the irradiation position controller controls so that an irradiation path of the laser light irradiated to the optical disk is different for each revolution.

7. The image reader according to claim 6, wherein the irradiation position controller controls the irradiation position of the laser light in response to a voltage of an oscillating signal, and generates the oscillating signal with constant amplitude and frequency and with different phase for each revolution, when the optical disk makes multiple revolutions.

8. The image reader according to claim 6 further comprising:

a position information acquisition unit that acquires position information indicating a read start position and a read termination position in the radial direction of the optical disk; and a feed width information acquisition unit that acquires feed width information indicating the feed width, wherein the feeding unit transports the irradiation unit from the read start position to the read termination position by the feed width indicated by the feed width information acquired by the feed width information acquisition unit in the radial direction each time the optical disk makes multiple revolutions.

9. A method of reading an image formed on an optical disk, the method comprising:

rotating an optical disk;

irradiating the optical disk by an irradiation unit with a laser light at a predetermined level;

transporting the irradiation unit of the optical disk by a predetermined feed width in a radial direction of the optical disk while the optical disk is rotated;

receiving reflection light of the laser light applied to the optical disk by the irradiation unit;

determining a gradation level for each predetermined dot region along a circumferential direction of the optical disk in response to an amount of the received reflection light;

outputting pixel data indicating the determined gradation level for each dot region; and acquiring position information indicating a read start position and a read termination position in the radial direction of the optical disk;

wherein the irradiation unit is transported from the read start position to the read termination position indicated in the acquired position information by a predetermined feed with in the radial direction each time the optical disk makes one revolution, and wherein the reflection light of the laser light applied to the optical disk is received over a time period during which the optical disk makes one revolution.

10. The method according to claim 9 further comprising oscillating an irradiated position of the laser light in the radial direction, wherein the reflection light of the irradiated and oscillated laser light is received.

11. The method according to claim 9, further comprising reading an image formed on the optical disk by irradiating the rotated optical disk with laser light and receiving reflected laser light from the rotated optical disk, and determining a gradation level from the reflected laser light;

detecting a non-drawing region from the read image; and forming an additional image on the detected non-drawing region by irradiating the optical disk with laser light.

12. The method according to claim 11 further comprising, if two or more non-drawing regions are detected, determining a size of each of the non-drawing regions and determining one of the non-drawing regions in which the additional image is to be formed.

* * * * *